United States Patent
Jalink, Jr. et al.

[11] Patent Number: 5,867,991
[45] Date of Patent: Feb. 9, 1999

[54] FERROELECTRIC STIRLING-CYCLE REFRIGERATOR

[75] Inventors: Antony Jalink, Jr., Newport News; Richard F. Hellbaum, Hampton; Wayne W. Rohrbach, Yorktown, all of Va.

[73] Assignee: The United States of America as represented by the Administrator of the National Aeronautics and Space Administration, Washington, D.C.

[21] Appl. No.: 840,111

[22] Filed: Apr. 3, 1997

Related U.S. Application Data

[60] Provisional application No. 60/015,969, Apr. 3, 1996.

[51] Int. Cl.$^6$ .................................................... F25B 9/00
[52] U.S. Cl. ................................................ 62/6; 62/467
[58] Field of Search ............................................. 62/6, 467

[56] References Cited

U.S. PATENT DOCUMENTS

| | | | |
|---|---|---|---|
| 4,056,745 | 11/1977 | Eckels . | |
| 4,499,737 | 2/1985 | Binnig et al. . | |
| 4,507,927 | 4/1985 | Barclay . | |
| 4,664,685 | 5/1987 | Young .......................................... | 62/6 |
| 4,953,366 | 9/1990 | Swift et al. . | |
| 5,056,316 | 10/1991 | Chung . | |
| 5,275,002 | 1/1994 | Inoue et al. . | |
| 5,284,022 | 2/1994 | Chung . | |
| 5,303,555 | 4/1994 | Chrysler et al. . | |
| 5,319,948 | 6/1994 | Blum et al. . | |
| 5,457,956 | 10/1995 | Bowman et al. .......................... | 62/6 X |
| 5,463,868 | 11/1995 | Peschka et al. ................................ | 62/6 |
| 5,471,721 | 12/1995 | Haertling ................................ | 29/25.35 |

*Primary Examiner*—Christopher B. Kilner
*Attorney, Agent, or Firm*—Robin W. Edwards

[57] ABSTRACT

A Stirling-cycle refrigerator has a three-pump configuration and pumping sequence, in which one pump serves as a compressor, one pump serves as an expander, and one pump serves as a displacer. The pumps are ferroelectrically actuated diaphragm pumps which are coordinated by synchronizing the ferroelectric-actuator voltages in such a way that the net effect of the displacer is to reduce the deleterious effect of dead space; that is, to circulate a greater fraction of the working fluid through the heat exchangers than would be possible by use of the compressor and expander alone. In addition, the displacer can be controlled separately to make the flow of working fluid in the heat exchangers turbulent (to increase the rate of transfer of heat at the cost of greater resistance to flow) or laminar (to decrease the resistance to flow at the cost of a lower heat-transfer rate).

24 Claims, 2 Drawing Sheets

FERROELECTRIC STIRLING-CYCLE REFRIGERATOR

CLAIM OF BENEFIT OF PROVISIONAL APPLICATION

Pursuant to 35 U.S.C. §119, the benefit of priority from provisional application 60/015,969, with a filing date of Apr. 3, 1996, is claimed for this non-provisional application.

CROSS REFERENCE TO RELATED CASES

This application is related to co-pending, commonly owned patent application Ser. No. 08/832,246, filed Apr. 3, 1997, entitled "Ferroelectric Pump" and co-pending, commonly owned patent application Ser. No. 08/832,260, filed Apr. 3, 1997, entitled "Ferroelectric Fluid Flow Control Valve."

ORIGIN OF THE INVENTION

The invention described herein was made by employees of the United States Government and may be manufactured and used by the government for governmental purposes without the payment of any royalties thereon or therefor.

BACKGROUND OF THE INVENTION

1. Field of the Invention

This invention relates generally to a device for cryogenic cooling. More particularly, the present invention relates to a cryogenic refrigerator which utilizes a displacer to optimize heat exchanger performance and reduce dead space, separates the displacement and compression functions, and eliminates unwanted vibration. More specifically, the present invention relates to a Stirling-Cycle refrigerator which utilizes a ferroelectrically actuated diaphragm compressor pump, a ferroelectrically actuated diaphragm expander pump and a ferroelectrically actuated diaphragm displacer pump, wherein each pump has one or more high displacement ferroelectric actuators.

2. Description of the Related Art

Problems existing with present Stirling cycle cryogenic refrigerators include deleterious effects of dead space, lack of controllability of flow rate, contamination of the working fluid, and unwanted vibration. The mechanical vibrations are transmitted to the sensitive, delicate optical components being refrigerated. Also, cryocoolers have micro-sized fluid passages that are extremely sensitive to contamination. Piston devices use lubricants and/or produce wear particles which have a propensity to contaminate the area containing the working gas. Some devices also contain piston-to-cylinder clearance seals which are very complex. The need for highly precise manufacturing and assembly of the multitude of parts required for existing Stirling-cycle devices makes them costly.

An acoustic cryocooler having no moving parts is disclosed in U.S. Pat. No. 4,953,366. Pulse tubes replace the compressor and expander to generate a standing wave which drives the cryocooler. The resonator tubes have to be of sufficient length to support the resonant frequency of the standing wave; therefore, the cooler tends to be relatively large. Also, the frequency of the required standing wave is normally in the acoustic range which tends to make the units noisy. It would be advantageous to have a cryocooler which is more compact in size and which could be dynamically balanced to alleviate undesirable vibration and noise. It would also be advantageous to have a Stirling-cycle cryocooler which avoids contamination. Lastly, a design which removes the deleterious effects of dead space and allows for control of flow rate through the heat exchangers would be beneficial.

STATEMENT OF INVENTION

Accordingly, one object of the invention is to provide a Stirling-cycle refrigerator which is simpler and less costly to produce than existing Stirling-cycle refrigerators.

Another object is to provide a Stirling-cycle refrigerator which is less sensitive to contamination than existing Stirling-cycle refrigerators.

A further object is to provide a Stirling-cycle refrigerator which can reduce dead space.

Another object of the invention is to provide a Stirling-cycle refrigerator which allows for flow control to optimize heat exchanger performance.

Another object is to provide a Stirling-cycle refrigerator which separates the compression and displacement functions.

Still another object is to provide a Stirling-cycle refrigerator which suffers less mechanical vibration.

Another object of the invention is to provide a Stirling-cycle refrigerator which has a three-pump configuration and pumping sequence, in which one pump serves as a compressor, one pump serves as an expander, and one pump serves as a displacer.

Another object is to control between laminar and turbulent flow in the heat exchangers for improved heat exchanger performance.

Another object of the invention is to provide a Stirling-cycle refrigerator which utilizes a ferroelectrically actuated diaphragm compressor pump, a ferroelectrically actuated diaphragm expander pump, and a ferroelectrically actuated diaphragm displacer pump, wherein each pump has one or more dome shaped internally prestressed ferroelectric actuators having a rim and an apex, and a dome height measured from a plane through the rim to the apex that varies with an electric voltage applied between an inside and outside surface the actuator.

Yet another object of the invention is to provide a Stirling-cycle refrigerator which can use varying waveforms to drive the pumps.

Additional objects and advantages of the present invention are apparent from the drawings and specification which follow.

SUMMARY OF THE INVENTION

According to the present invention, the foregoing and other objects and advantages are attained by providing a Stirling-cycle cryogenic device that is suitable for cooling sensitive infrared detectors to very low temperatures. Stirling-cycle refrigerators operate on a closed thermodynamic regenerative cycle with isothermal compression and expansion of the working fluid at different temperature levels. The present refrigerator has a freezer heat exchanger, a regenerator heat exchanger, and a hot heat exchanger. Pumps are also an integral part of this type of refrigerator. Ferroelectric pumps, such as that claimed in "Ferroelectric Pump," Ser. No. 08/832,246, filed Apr. 3, 1997, and hereby incorporated by reference, are used in the refrigerator as high-performance compressor and expander pumps. In order to further improve the refrigerator's performance, the invention also uses the ferroelectric pumping device as a displacer pump to optimize heat exchanger performance and reduce dead space. External electrical inputs to the displacer pump are used to control whether laminar or turbulent flow exists at any one time in the heat exchangers for improved heat exchanger performance.

The entire refrigerator system is filled with a pressurized noncondensable gas which attains a uniform equilibrium pressure throughout the refrigerator system when the pumps are at rest. The specific application determines the working fluid used. Helium and argon are two working fluids generally used. The working fluid is compressed and circulated by three ferroelectrically actuated diaphragm pumps that offer advantages of greater reliability, relative simplicity, and lower cost in comparison with older piston-in-cylinder pumps.

Each diaphragm is a dome shaped internally prestressed ferroelectric actuator having a rim and an apex, and a dome height measured from a plane through the rim to the apex that varies with an electric voltage applied between an inside and outside surface of the actuator. Examples of such actuators are shown in U.S. Pat. No. 5,471,721 and commonly available from Aura Ceramics, hereby incorporated by reference, and "Thin Layer Composite Unimorph Ferroelectric Driver and Sensor", U.S. Pat. No. 5,632,841, and "Thin Layer Composite Unimorph Ferroelectric Driver and Sensor, " Ser. No. 08/797,553, filed Jan. 24, 1997, both also hereby incorporated by reference.

Depending on the polarity of an applied voltage, the diaphragm becomes deformed, via the ferroelectric effect, toward a flatter or more curved shape. To reduce vibration, each of the three pumps contains two diaphragms that are simultaneously deformed outward to increase the volume of the pump chamber (to draw fluid in) or simultaneously deformed inward to decrease the volume of the pump chamber (to expel fluid). Because these deformations involve motion of lightweight parts in opposite directions, the pumping action contributes very little (other than through motion of the fluid) to vibration; this is an important advantage where vibration could disturb a delicately aimed infrared instrument. A single diaphragm can also be used when vibration is not a concern.

With respect to the compression and expansion of the working fluid, the circulation of the working fluid through the heat exchangers, and the transfer of heat to and from the working fluid, this refrigerator operates according to principles that are familiar in the technology of refrigeration. One novel feature is the use of the ferroelectric pumps. Another novel feature is the particular three-pump configuration and pumping sequence, in which one pump serves as a compressor, one pump serves as an expander, and one pump serves as a displacer. Further novel features are controllability of flow between laminar and turbulent, and separate compression and displacement functions.

The operation of the pumps is coordinated by synchronizing the ferroelectric actuator voltages in such a way that the net effect of the displacer is to reduce the deleterious effect of dead space, i.e. to circulate a greater fraction of the working fluid through the heat exchangers than would be possible by use of the compressor and expander alone. In addition, the displacer can be controlled separately to make the flow of working fluid in the heat exchangers turbulent (to increase the rate of transfer of heat at the cost of greater resistance to flow) or laminar (to decrease the resistance to flow at the cost of a lower heat-transfer rate).

When the refrigerator system is a rest the compressor's ferroelectrically actuated diaphragms are in their flat-most position. Upon electrical stimulation from an external source, the diaphragms become more bowed and expel the gas from the space between them. The compressor can contain capillary passages to allow the gas to equilibrate on both sides of each diaphragm when the refrigerator is at rest. The small diameter of the capillaries prevents the compressor pulse from being bypassed into the space on the outside of each diaphragm. Also, the volume of this space located at the outside of the diaphragms should be very large relative to the volume displaced by the diaphragms so that the change in volume of the space during compressor operation offers negligible resistance to the needed diaphragm motion. The expander diaphragms are in their bowed-most position when the refrigerator system is at rest. Upon electrical stimulation from an external source, the diaphragms flatten and take the working fluid into the space between them. Again, the two opposite-moving diaphragms are used for mechanical balancing.

In addition to the three pumps, the refrigerator system also contains a hot heat exchanger, a regenerator heat exchanger and a freezer heat exchanger located in series proceeding from the compressor pump to the expander pump. The hot heat exchanger transfers heat from the working fluid to an external heat sink. The regenerator heat exchanger transfers heat it has taken away from the working fluid during one time period, back into the working fluid during a later time period, and visa versa. With the exception of the working fluid, the regenerator heat exchanger is thermally isolated from the rest of the refrigerator system and its environment. The freezer heat exchanger transfers heat from the chamber to be cooled to the working fluid.

The boost in displacement flow, obtained by use of the displacer pump, overcomes the deleterious effects of dead space suffered by prior refrigerators. Because the displacer pump output wave shape as a function of time is controlled with respect to other Stirling-cycle events, optimization of the heat exchangers can occur. When the temperature difference between the working fluid and the heat exchanger is maximum, the flow is rendered turbulent to promote heat exchange at a cost of greater flow resistance. When the temperature difference is less, the flow is rendered laminar to provide minimum flow resistance at a cost of a lower heat-transfer rate. Superimposing a high frequency forces the flow turbulent when operating near the transition point. Again, two opposite moving diaphragms can be used to eliminate unwanted vibration.

The controllability considerations of laminar versus turbulent working fluid flow is new to Stirling-cycle refrigerator design. Also, the extremely light weight of the moving pump parts combined with the mechanical balancing from the opposing dual diaphragm design is a critical improvement.

Conventional pumps can be used, rather than ferroelectric pumps; however, ferroelectric pumps allow phase and wave shape of the flow to be tailored, are lightweight and have less vibration. A piston pump allows only sinusoidal wave shape.

BRIEF DESCRIPTION OF THE DRAWINGS

A more complete appreciation of the invention and the many of the attendant advantages thereof will be readily attained as the same becomes better understood by reference to the following detailed description when considered in connection with the accompanying drawings, wherein.

DETAILED DESCRIPTION OF THE INVENTION

Figure 1:
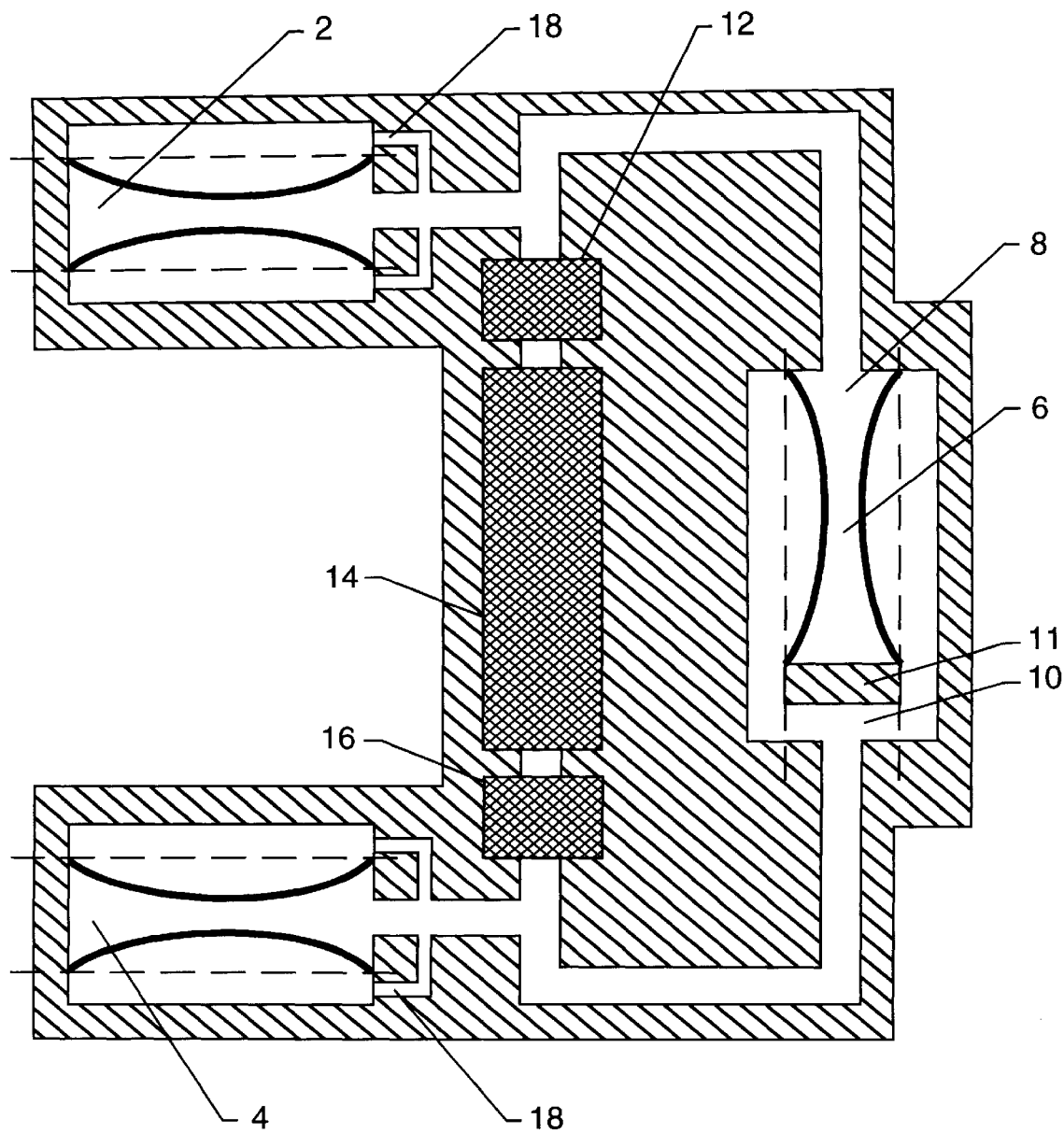
FIG. 1 is a diagram of one embodiment of the Stirling-cycle refrigerator having a compressor pump, an expander pump, and a displacer pump.

FIG. 1 is a diagram of a preferred embodiment of the Stirling-cycle refrigerator having a predetermined mass of a working fluid within an enclosed volume, a compressor pump 2, an expander pump 4, a displacer pump 6 and a heat exchanger system. The working fluid is a noncondensable gas. The specific application determines the noncondensable gas used; however, helium and argon are generally used. The operation of this Stirling-cycle refrigerator is best defined by a four-step cycle. First, the compressor pump 2 is energized by an external electrical power input to expel the working fluid to the volume of the refrigerator system, in an amount equal to one-half of the total compressor displacement. The result is a compression of the working fluid throughout the refrigerator system. The temperature of the working fluid will also increase as a result of its compression.

Second, the compressor pump 2 continues to be energized to expel the remainder one-half of its displacement capacity to the volume of the refrigerator system. Simultaneously, the expander pump 4 is energized by an external electrical power input to take in one-half of its total displacement capacity in the working fluid from the volume of the refrigerator system. Also simultaneously, the displacer pump 6 is energized by externally applied electrical power to move the entirety of its displacement. The working fluid is pushed from the right-side port 8 of the displacement pump 6 towards the suction created by the displacement pump 6 at the left-hand port 10. Seal 11 can be of any suitable configuration. The result is that, in this second step, all three pumps 2, 4 and 6 cooperate to move the working fluid in the refrigerator system from the space at the output of the compressor 2, through the three heat exchangers 12, 14 and 16, towards the space at the output of the expander 4. While the working fluid moves through the hot heat exchanger 12 during this second step, the working fluid gives up part of the heat it gained while it was being compressed in the first step. Simultaneously during this second step, heat will be transferred from the working fluid into the regenerator heat exchanger 14. A step four which will be discussed later will show that at the start of the present step two, the regenerator temperature is actually a bit below its ambient. Also simultaneously, during this second step, heat is transferred from the working fluid into the freezer heat exchanger 16. The freezer heat exchanger 16 is actually at a relatively low temperature imparted during previous steps three and four which will be discussed later. Note that the displacer pump 6 neither compresses nor expands the working fluid. The important contribution of this pump is to help propel the working fluid through the heat exchangers 12, 14 and 16. This flow augmentation is crucial in view of ever-present pumping dead space. Also, the speed of displacer pump 6 can be controlled externally to render the flow of the working fluid in the heat exchangers 12, 14 and 16 either laminar (i.e., low gas flow resistance and low heat exchange rate) or turbulent (i.e., high gas flow resistance and high heat exchange rate) for optimizing the heat exchanger efficiency. Superimposing a high frequency forces the flow turbulent when operating near the transition point.

Third, the expander pump 4, for the remainder one-half of its displacement capacity, continues to take in working fluid from the refrigerator volume. Thus, the working fluid expands throughout the refrigerator system and the temperature of the working fluid is lowered.

Fourth, the expander pump 4 is energized to expel its entire displacement capacity of working fluid into the volume of the refrigerator system. Simultaneously, the compressor pump 2 is energized to take in its entire displacement capacity in working fluid from the volume of the refrigerator system. Also simultaneously, the displacer pump 6 is energized. In this step, the displacer pump 6 pushes the working fluid from its left side port 10 toward the suction created by the pump at its right hand port 8. The displacer pump 6 moves its total displacement capacity. The result is that, in this fourth step, all three pumps 2, 4 and 6 cooperate to move the working fluid in the refrigerator system from the space at the output of the expander 4, through the three heat exchangers 12, 14 and 16, towards the space at the output of the compressor 2. During this fourth step, while the working fluid moves through the freezer heat exchanger 16, the working fluid takes up thermal energy gained while it was being expanded in step three. Simultaneously during this fourth step, heat will be transferred from the regenerator heat exchanger 14 into the working fluid where it is carried towards the hot heat exchanger 12 to be expelled from the refrigerator. Note that again the displacement pump 6 neither compresses nor expands the working fluid. Again, its important contribution is to help move the working fluid through the heat exchangers.

The above steps one through four are repeated continuously, creating a flow oscillation in the refrigerator system. The compressor 2 and expander 4 can contain capillary passages 18 to allow the working fluid to equilibrate on both sides of each diaphragm when the refrigerator is at rest. The small diameter of the capillaries 18 prevents the compressor 2 or expander 4 pulses from being bypassed into the space on the outside of each diaphragm. Also, the volume of this space located at the outside of the diaphragms should be very large relative to the volume displaced by the diaphragms so that the change in volume of the space during compressor 2 and expander 4 operation offers negligible resistance to the needed diaphragm motion.

The work capacity of the pump devices 2, 4 and 6 can be increased by using pumps which utilize multiple ferroelectric actuators mounted on a common manifold. Such a configuration is described in U.S. Pat. No. 5,471,721 and in "Thin Layer Composite Unimorph Ferroelectric Driver and Sensor", Ser. No. 08/416,598, filed Apr. 4, 1995.

Figure 2:
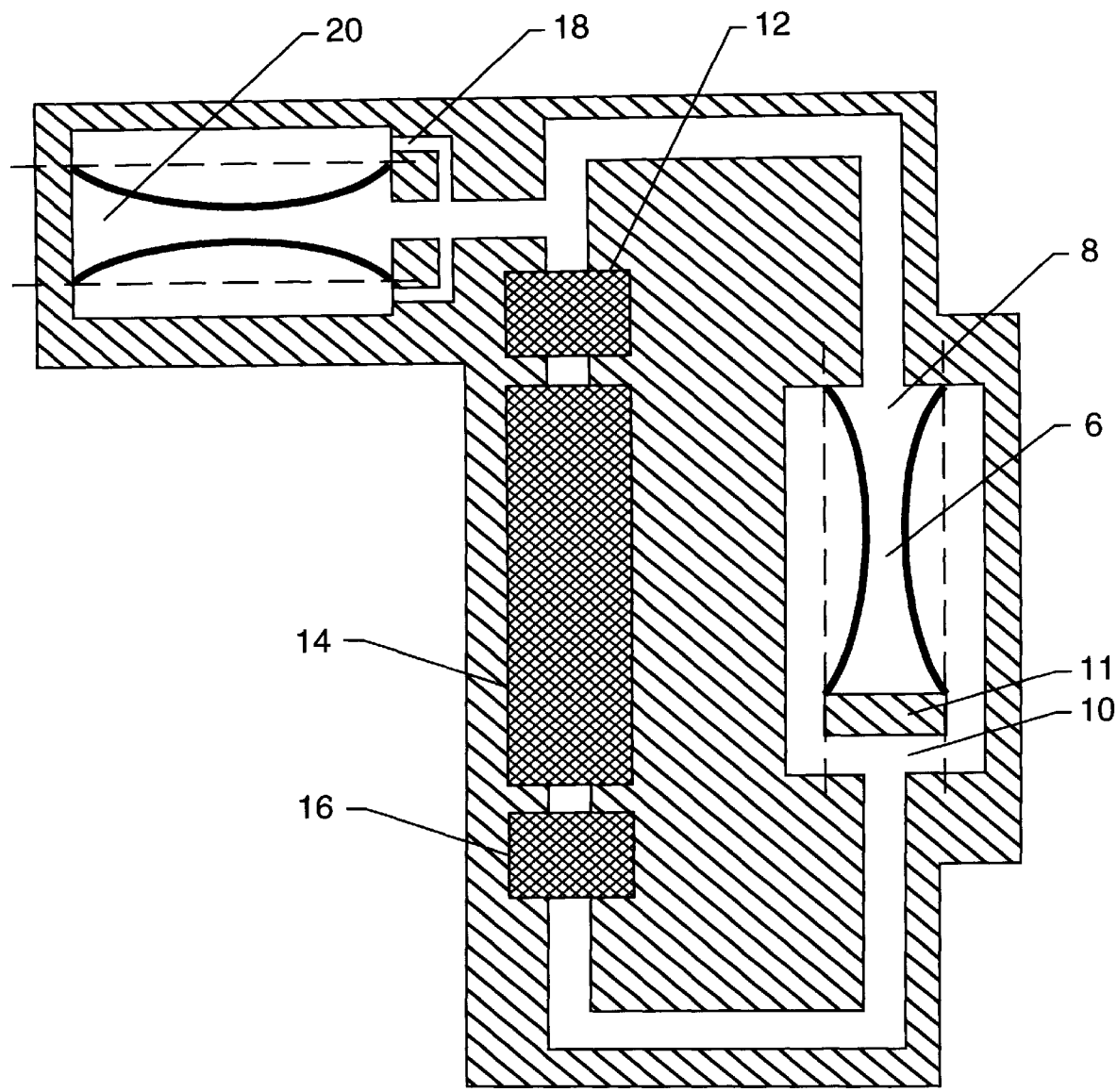
FIG. 2 is a diagram of one embodiment of the Stirling-cycle refrigerator having a single pump performing as both compressor and expander, and a separate displacer pump.

In a second embodiment, shown in FIG. 2, a single pump 20 can be used to perform as both compressor and displacer.

Obviously, numerous additional modifications and variations of the present invention are possible in light of above teachings. It is therefore to be understood that within the scope of the appended claims, the invention may be practiced otherwise than is specifically described herein.

What is claimed is:

1. A Stirling-cycle refrigerator, comprising:

an enclosed working volume;

a predetermined mass of noncondensable gas within said working volume;

a compressor pump which compresses said gas throughout said enclosed working volume;

an expander pump which expands said gas throughout said enclosed working volume;

a heat exchanger means in fluid communication between said compressor pump;

a displacer pump in fluid communication with said heat exchanger means;

electrical control means for controlling said compressor pump and said expander pump such that said gas is cyclically compressed and expanded throughout said working volume, and for controlling said displacer pump to prevent dead space within said enclosed volume, modify said displacer pump output wave shape as a function of time, and adjust between laminar and turbulent flow through said heat exchanger means.

2. The device of claim 1, wherein said compressor pump and said expander pump are ferroelectrically actuated diaphragm pumps.

3. The device of claim 2, wherein each said ferroelectrically actuator diaphragm pump comprises at least one dome shaped internally prestressed ferroelectric actuator having a rim and an apex and a dome height measured from a plane through said rim to said apex that varies with an electric voltage applied between the inside and outside surface of said actuator.

4. The device of claim 1, wherein said displacer pump is a ferroelectrically actuated diaphragm pump.

5. The device of claim 4, wherein said ferroelectrically actuator diaphragm pump comprises at least one dome shaped internally prestressed ferroelectric actuator having a rim and an apex and a dome height measured from a plane through said rim to said apex that varies with an electric voltage applied between the inside and outside surface of said actuator.

6. The device of claim 1, wherein the heat exchanger means comprises:
a hot heat exchanger which transfers heat from said gas to an external heat sink;
a regenerator heat exchanger which transfers heat taken away from said gas during the first half of a cycle, back into said gas during the later half cycle and vise versa; and
a freezer heat exchanger which transfers heat from the chamber to be cooled to said gas;
wherein said regenerator heat exchanger is in fluid communication between said hot heat exchanger and said freezer heat exchanger.

7. The device of claim 2, wherein dual opposite-moving ferroelectrically actuated diaphragms are used in said compressor pump and said expander pump for mechanical balancing to minimize unwanted vibrations.

8. The device of claim 4, wherein dual opposite-moving ferroelectrically actuated diaphragms are used in said compressor pump for mechanical balancing to minimize unwanted vibrations.

9. The device of claim 7, further comprising capillary passages connected from each said pumping chamber to each said pump entrance to allow said gas pressure to equilibrate on both sides of each said diaphragm when said refrigerator is at rest.

10. The device of claim 8, further comprising capillary passages connected from each said pumping chamber to each said pump entrance to allow said gas pressure to equilibrate on both sides of each said diaphragm when said refrigerator is at rest.

11. A Stirling-cycle refrigerator, comprising:
an enclosed working volume;
a predetermined mass of noncondensable gas within said working volume;
a ferroelectrically actuated pump which both compresses and expands said gas throughout said enclosed working volume;
a heat exchanger means in fluid communication between said compressor pump;
a displacer pump in fluid communication with said heat exchanger means; and electrical control means for controlling said pump such that said gas is cyclically compressed and expanded throughout said working volume, and for controlling said displacer pump to prevent dead space within said enclosed volume, modify said displacer pump output wave shape as a function of time, and adjust between laminar and turbulent flow through said heat exchanger means.

12. The device of claim 1, wherein said gas is helium.

13. The device of claim 1, wherein said gas is argon.

14. A Stirling-cycle refrigerator, comprising:
an enclosed working volume;
a predetermined mass of noncondensable gas within said working volume;
a compressor pump which compresses said gas throughout said enclosed working volume, said compressor pump comprising dual opposite-moving ferroelectrically actuated diaphragms;
an expander pump which expands said gas throughout said enclosed working volume, said expander pump comprising dual opposite-moving ferroelectrically actuated diaphragms;
a heat exchanger means in fluid communication between said compressor pump; and
electrical control means for controlling said compressor pump and said expander pump such that said gas is cyclically compressed and expanded throughout said working volume.

15. The device of claim 14, wherein each said ferroelectrically actuated diaphragm comprises a dome shaped internally prestressed ferroelectric actuator having a rim and an apex, and a dome height measured from a plane through said rim to said apex that varies with an electric voltage applied between the inside and outside surface of said actuator.

16. The device of claim 14, further comprising:
a displacer pump in fluid communication with said heat exchanger means; and
electrical control means for controlling said displacer pump to prevent dead space within said enclosed volume, modify said displacer pump output wave shape as a function of time, and adjust between laminar and turbulent flow said heat exchanger means.

17. The device of claim 16, wherein said displacer pump is a ferroelectrically actuated diaphragm pump.

18. The device of claim 17, wherein said ferroelectrically actuated diaphragm pump comprises at least one dome shaped prestressed ferroelectric actuator having a rim and an apex and a dome height measured form a plane through said rim to said apex that varies with an electric voltage applied between the inside and outside surface of said actuator.

19. The device of claim 14, wherein said heat exchanger means comprises:
a hot heat exchanger which transfers heat from said gas to an external heat sink;
a regenerator heat exchanger which transfers heat taken away from said gas during the first half of a cycle, back into said gas during the later half cycle and vise versa; and
a freezer heat exchanger which transfers heat from the chamber to be cooled to said gas;
wherein said regenerator heat exchanger is in fluid communication between said hot heat exchanger and said freezer heat exchanger.

20. The device of claim 16, wherein said heat exchanger means comprises:

a hot heat exchanger which transfers heat from said gas to an external heat sink;

a regenerator heat exchanger which transfers heat taken away from said gas during the first half of a cycle, back into said gas during the later half cycle and vise versa; and a freezer heat exchanger which transfers heat from the chamber to be cooled to said gas;

wherein said regenerator heat exchanger is in fluid communication between said hot heat exchanger and said freezer heat exchanger.

21. The device of claim 14, further comprising capillary passages connected from each pumping chamber to each pump entrance to allow the gas pressure to equilibrate on both sides of each said diaphragm when said refrigerator is at rest.

22. A Stirling-cycle refrigerator, comprising:

an enclosed working volume;

a predetermined mass of noncondensable gas within said working volume;

a ferroelectrically actuated pump which both compresses and expands said gas throughout said enclosed working volume, said pump comprised of dual opposite-moving ferroelectrically actuated diaphragms;

a heat exchanger means in fluid communication between said compressor pump; and electrical control means for controlling said pump such that said gas is cyclically compressed and expanded throughout said working volume.

23. The device of claim 14, wherein said gas is helium.

24. The device of claim 14, wherein said gas is argon.

* * * * *